US011658330B2

(12) United States Patent
Jin et al.

(10) Patent No.: US 11,658,330 B2
(45) Date of Patent: May 23, 2023

(54) BATTERY

(71) Applicant: Contemporary Amperex Technology Co., Limited, Ningde (CN)

(72) Inventors: Haizu Jin, Ningde (CN); Xiaowen Zhang, Ningde (CN); Zhenhua Li, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/732,571

(22) Filed: Apr. 29, 2022

(65) Prior Publication Data

US 2022/0255114 A1 Aug. 11, 2022

Related U.S. Application Data

(63) Continuation of application No. 16/433,662, filed on Jun. 6, 2019, now Pat. No. 11,362,364.

(30) Foreign Application Priority Data

Nov. 16, 2018 (CN) .................. CN201811368959

(51) Int. Cl.
| | |
|---|---|
| *H01M 10/04* | (2006.01) |
| *H01M 4/525* | (2010.01) |
| *H01M 10/0565* | (2010.01) |

(52) U.S. Cl.
CPC ....... *H01M 10/0459* (2013.01); *H01M 4/525* (2013.01); *H01M 10/045* (2013.01); *H01M 10/0565* (2013.01)

(58) Field of Classification Search
CPC . H01M 10/0525; H01M 10/045–0459; H01M 10/0565; H01M 4/525
See application file for complete search history.

(56) References Cited

U.S. PATENT DOCUMENTS

| | | |
|---|---|---|
| 2006/0099495 A1 | 5/2006 | Suzuki et al. |
| 2013/0147439 A1 | 6/2013 | Takahashi |
| 2019/0214635 A1 | 7/2019 | Sugimori et al. |

FOREIGN PATENT DOCUMENTS

| | | |
|---|---|---|
| CN | 101471435 A | 7/2009 |
| CN | 102187497 A | 9/2011 |

(Continued)

OTHER PUBLICATIONS

PCT International Search Report for PCT/CN2019/118507, dated Feb. 19, 2020, 13 pages.

(Continued)

*Primary Examiner* — Karie O'Neill Apicella

(74) *Attorney, Agent, or Firm* — East IP P.C.

(57) ABSTRACT

This application relates to a battery comprising a positive electrode plate, a separator, and a negative electrode plate, wherein the positive electrode plate comprises a positive electrode current collector and at least two layers of positive active material coated on at least one surface of the positive electrode current collector, and wherein an underlying positive active material layer in contact with the positive electrode current collector comprises a first positive active material, a first polymer material and a first conductive material; and wherein an upper positive active material layer in contact with the underlying positive active material layer and away from the positive electrode current collector comprises a second positive active material, a second polymer material and a second conductive material, and the first polymer material comprises fluorinated polyolefin and/or chlorinated polyolefin polymer material. The battery has good safety and improved electrical properties.

13 Claims, 1 Drawing Sheet

(56) References Cited

FOREIGN PATENT DOCUMENTS

| | | | | |
|---|---|---|---|---|
| CN | 103165863 A | * | 6/2013 | ............ H01M 4/136 |
| CN | 103165863 A | | 6/2013 | |
| CN | 106981684 A | | 7/2017 | |
| CN | 109755467 A | | 5/2019 | |
| CN | 109755468 A | | 5/2019 | |
| JP | 2008027633 A | | 2/2008 | |
| JP | 2010238588 A | | 10/2010 | |
| WO | 2017126510 A1 | | 7/2017 | |
| WO | 2018043188 A1 | | 3/2018 | |

OTHER PUBLICATIONS

The First Office Action for Chinese Application No. 201811368959.5, dated Sep. 1, 2020, 16 pages.
The extended European search report dated Aug. 21, 2019 for European Application No. 19179672.1, 8 pages.
The Second Office Action for Chinese Application No. 201811368959.5, dated Nov. 9, 2020, 15 pages.
The First Office Action for European Application No. 19179672.1, dated May 28, 2020, 5 pages.
The Second Office Action for European Application No. 19179672.1, dated Oct. 21, 2020, 4 pages.

* cited by examiner

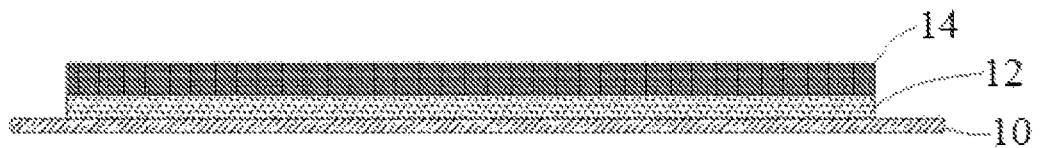

BATTERY

CROSS-REFERENCE TO RELATED APPLICATION

This application is a continuation of U.S. patent application Ser. No. 16/433,662, filed on Jun. 6, 2019, which claims priority to Chinese Patent Application No. CN201811368959.5, filed on Nov. 16, 2018, both of which are incorporated herein by reference in their entireties.

TECHNICAL FIELD

This application belongs the field of electrochemical technology, and more particularly, this application relates to a battery.

BACKGROUND

Lithium-ion batteries are widely used in electric vehicles and consumer electronics because of their high energy density, high output power, long cycle life and small environmental pollution. However, lithium-ion batteries are prone to fire and explode when subjected to abnormal conditions such as crushing, bumping or puncture, causing serious harm. Therefore, the safety problem of lithium-ion batteries greatly limits the application and popularity of lithium-ion batteries.

Although researchers have proposed many ways to improve the safety of batteries, there is still no very effective means for the safety hazard caused by the puncture of the battery. In view of this, it is indeed necessary to provide a battery that has improved battery safety, especially nail penetration safety.

SUMMARY

It is an object of this application to provide a battery with improved safety, especially with improved nail penetration safety.

It is a further object of this application to provide a battery having excellent properties such as good safety, improved electrical properties, and good processability.

This application provides a battery comprising a positive electrode plate, a separator, and a negative electrode plate, wherein the positive electrode plate comprises a positive electrode current collector and at least two layers of positive active material coated on at least one surface of the positive electrode current collector, and wherein an underlying positive active material layer in contact with the positive electrode current collector comprises a first positive active material, a first polymer material and a first conductive material, and based on the total weight of the underlying positive active material layer, the first positive active material has a content of A % by weight, the first polymer material has a content of B % by weight, and the first conductive material has a content of C % by weight; and wherein an upper positive active material layer in contact with the underlying positive active material layer and away from the positive electrode current collector comprises a second positive active material, a second polymer material and a second conductive material, and based on the total weight of the upper positive active material layer, the second positive active material has a content of A'% by weight, the second polymer material has a content of B'% by weight, and the second conductive material has a content of C'% by weight, wherein A %<A'%, B %>B'%, C %≥C'%, and the first polymer material comprises fluorinated polyolefin and/or chlorinated polyolefin polymer material.

The battery of this application has good safety and improved electrical properties.

DESCRIPTION OF THE DRAWINGS

The battery and the beneficial effects of this application will be described in detail below with reference to the accompanying drawings and specific embodiments.

FIG. 1 is a schematic structural view of a positive electrode plate according to an embodiment of this application, in which 10—a positive electrode current collector; 14—an upper positive active material layer; 12—an underlying positive active material layer.

DETAILED DESCRIPTION

A large number of experimental results show that internal short circuit of battery is the root cause of the safety hazard of lithium-ion batteries. The root cause of internal short circuit of battery is the electrical connection between the positive electrode plate and the negative electrode plate inside the battery. In the abnormal case such as nail penetration, the direct contact of the metal burr (usually Al metal burr) produced in the positive electrode plate with the negative electrode plate can cause internal short circuit of battery. The inventors of this application have found that the metal burr of the positive electrode plate can be effectively masked (or wrapped) by the coating design of the positive electrode plate, thereby preventing internal short circuit of battery and the resulting thermal runaway of the battery.

This application discloses a battery comprising a positive electrode plate, a separator and a negative electrode plate. The positive electrode plate in the battery comprises a positive electrode current collector and at least two layers of positive active material coated on at least one surface of the positive electrode current collector. Since the at least two layers of the positive active material are respectively formed on the current collector and they are usually tightly bonded together, when the coating is peeled off from the current collector, generally a coating as a whole is obtained. Therefore, the at least two layers of the positive active material are collectively referred to as a positive electrode film layer.

The underlying positive active material layer in contact with the positive electrode current collector comprises a first positive active material, a first polymer material and a first conductive material, and based on the total weight of the underlying positive active material layer, the first positive active material has a content of A % by weight, the first polymer material has a content of B % by weight, and the first conductive material has a content of C % by weight.

The upper positive active material layer in contact with the underlying positive active material layer and away from the positive electrode current collector comprises a second positive active material, a second polymer material and a second conductive material, and based on the total weight of the upper positive active material layer, the second positive active material has a content of A'% by weight, the second polymer material has a content of B'% by weight, and the second conductive material has a content of C'% by weight, wherein A %<A'%, B %>B'%, C %≥C'%, and wherein the first polymer material comprises fluorinated polyolefin and/or chlorinated polyolefin polymer material.

That is to say, the content of the polymer material and the content of the conductive material in the underlying positive active material layer are both higher than those of the upper positive active material layer. Since the underlying positive active material layer contains a relatively high content of the first polymer material, the underlying positive active material layer has the property of a binder layer compared with the upper positive active material layer, so that under abnormal conditions such as nail penetration the underlying positive active material layer can wrap the metal burrs that may be generated in the current collector to effectively prevent internal short circuit of battery.

Preferably, the adhesion force between the positive electrode film layer and the positive electrode current collector is 10 N/m or more. If the adhesion force is insufficient, the underlying positive active material layer may not effectively wrap metal burrs that may be generated in the current collector.

Further, it is found that when the content of the first polymer material in the underlying positive active material layer is relatively high, the first polymer material acts with the first conductive material together; and when the weight ratio of the first polymer material to the first conductive material is at least 2, the underlying positive active material layer will have a positive temperature coefficient effect (i.e., a PTC effect). The PTC action principle of the underlying positive active material layer is that: at normal temperature, the underlying positive active material layer conducts the electrons by virtue of a good conductive network formed between the first conductive materials; when the temperature increases, the volume of the first polymer material begins to expand, the spacing between the particles of the first conductive material increases, thus the conductive network is partially blocked, and the resistance of the underlying positive active material layer gradually increases; when a certain temperature (for example, the operating temperature) is reached, the conductive network is almost completely blocked, then the current approaches zero. The DC (direct current) resistance growth rate is a common parameter for characterizing the PTC effect. According to a preferred embodiment of this application, the underlying positive active material layer exhibits a PTC effect, and preferably, the battery has a DC resistance growth rate of 100% or more at 130° C.

Therefore, the underlying positive active material layer is disposed between the current collector and the upper positive active material layer as a primer layer, and simultaneously exerts the technical effects of a binder layer and a PTC safety coating, thereby greatly improving the nail penetration safety of battery.

In addition, the underlying positive active material layer further comprises a first positive active material, which can stabilize and improve the technical effect of the underlying positive active material layer as a binder layer and a PTC safety coating from the following three aspects:

(1) hindering the adverse effects of a solvent (such as NMP or the like) in the upper positive active material layer or an electrolyte on the first polymer material (for example, fluorinated polyolefin and/or chlorinated polyolefin polymer material) in the underlying positive active material layer, such as dissolving or swelling and the like; (2) beneficially ensuring that the underlying positive active material layer is not easily deformed during compaction process of electrode plate to avoid direct contact between the current collector and the upper positive active material layer; (3) improving the response speed and the like of the PTC effect of the underlying positive active material layer.

In a preferred embodiment of this application, the positive active material layer is a two-layer structure, that is to say, consisting of the upper positive active material layer and the underlying positive active material layer. This facilitates the simplification of the manufacturing process.

FIG. 1 shows a schematic structural view of a positive electrode plate according to some embodiments of this application, wherein 10 represents a current collector, 14 represents an upper positive active material layer, and 12 represents an underlying positive active material layer.

It is easy to understand that FIG. 1 only shows the embodiment in which the positive active material layer is only provided on one side of the positive electrode collector 10, the underlying positive active material layer 12 and the upper positive active material layer 14 may be respectively disposed on both sides of the positive current collector 10 in other embodiments.

Preferably, at least two layers of the positive active material are disposed on both surfaces of the positive electrode current collector to more effectively improve the nail penetration safety problem of the conventional lithium-ion battery.

In order to improve the nail penetration safety problem of the conventional lithium-ion battery, this application proposes a number of technical improvements, and combines various technical means to improve the nail penetration safety problem of the lithium-ion battery.

The specific composition and structure of the positive electrode plate in the battery of this application will be described in more detail below.

(1) Underlying Positive Active Material Layer

First, the inventors have found that the stability of the underlying positive active material layer and the properties thereof as a PTC layer and a binder layer can be improved by selecting the first polymer material in the underlying positive active material layer.

In this application, the fluorinated polyolefin and/or chlorinated polyolefin material actually functions in two ways, i.e. both as a PTC matrix and as a binder.

The underlying positive active material layer composed of the fluorinated polyolefin and/or chlorinated polyolefin material and the first conductive material may function as a PTC thermistor layer, and the operating temperature range may suitably be 80° C. to 160° C. Thus it can improve the high temperature safety performance of the battery.

The fluorinated polyolefin and/or chlorinated polyolefin as the first polymer material of the underlying positive active material layer serve as both a PTC matrix and a binder, thereby facilitating the preparation of a thinner underlying positive active material layer. Moreover, it is advantageous to improve the adhesion of the underlying positive active material layer and the adhesion force with the current collector.

In this application, the fluorinated polyolefin and/or chlorinated polyolefin refers to polyvinylidene fluoride (PVDF), polyvinylidene chloride (PVDC), modified PVDF, or modified PVDC. For example, the fluorinated polyolefin and/or chlorinated polyolefin may be selected from PVDF, carboxylic acid modified PVDF, acrylic acid modified PVDF, PVDF copolymer, PVDC, carboxylic acid modified PVDC, acrylic acid modified PVDC, PVDC copolymer, or any mixture thereof.

In this application, based on the total weight of the underlying positive active material layer, the content of the first polymer material B % generally satisfies 35 wt %≤ B %≤75 wt %.

Since the content of the first polymer material in the underlying positive active material layer is higher than the content of the second polymer material in the upper positive active material layer and is usually as high as 35 wt % or more, the underlying positive active material layer has the property of a binder layer compared with the upper positive active material layer, so that under abnormal conditions such as nail penetration the underlying positive active material layer can wrap the metal burrs that may be generated in the current collector to effectively prevent internal short circuit of battery. The content of the first polymer material is preferably from 40% by weight to 75% by weight, more preferably from 50% by weight to 75% by weight.

The first polymer material may all be a fluorinated polyolefin and/or chlorinated polyolefin polymer material.

If all the first polymer material in the underlying positive active material layer is a fluorinated polyolefin and/or chlorinated polyolefin, the following technical problems may occur:

(1) Since the fluorinated polyolefin and/or chlorinated polyolefin have a large dissolution and swelling in an organic oil solvent (such as NMP or the like) and an electrolyte, during the process of coating the upper positive active material layer, if the coating speed is too fast, it is easy to cause cracking of the upper positive active material layer due to uneven stress;

(2) Since the fluorinated polyolefin and/or chlorinated polyolefin have a large dissolution and swelling in an organic oil solvent (such as NMP or the like) and an electrolyte, the introduction of the underlying positive active material layer causes a large increase of battery DCR (DC internal resistance), which is not conducive to the improvement of the dynamic performance of the battery.

Since in the oil solvent the solubility of the difficultly soluble polymer material is smaller than the solubility of the fluorinated polyolefin and/or chlorinated polyolefin, the above technical problems can be solved by incorporating the difficultly soluble polymer material into the first polymer material of the underlying positive active material layer. That is to say, the difficultly soluble polymer material acts as a "difficultly soluble component" to hinder the too large dissolution and swelling of the fluorinated polyolefin and/or chlorinated polyolefin of the first polymer material in an organic oil solvent (such as NMP) and an electrolyte, as such to solve the problem of cracking and excessive DCR growth.

Therefore, as an improvement of this application, the first polymer material may also be a mixed material of a fluorinated polyolefin and/or chlorinated polyolefin polymer material with other difficultly soluble polymer materials, wherein in an oil solvent (preferably, in NMP) the solubility of the difficultly soluble polymer material is smaller than the solubility of the fluorinated polyolefin and/or chlorinated polyolefin polymer material.

The difficultly soluble polymer material may be one of an oil-dispersible polymer material or a water-dispersible polymer material.

When the difficultly soluble polymer material is an oil-dispersible polymer material, the oil-dispersible polymer material is preferably selected from at least one of oil-dispersible polyacrylonitrile, oil-dispersible polyacrylic acid, oil-dispersible polyacrylate, oil-dispersible polyacrylic acid-acrylate, oil-dispersible polyacrylonitrile-acrylic acid and oil-dispersible polyacrylonitrile-acrylate.

When the difficultly soluble polymer material is a water-dispersible polymer material, the water-dispersible polymer material is preferably selected from at least one of water-dispersible polyacrylic acid, water-dispersible polyurethane, water-dispersible polyvinyl alcohol, water-dispersible PVDF, water-dispersible polyacrylate, water-dispersible polytetrafluoroethylene, and water-dispersible polyacrylonitrile.

In this application, the water-dispersible polymer material means that the polymer molecular chain is completely extended and dispersed in water, and the oil-dispersible polymer material means that the polymer molecular chain is completely extended and dispersed in the oil solvent. Those skilled in the art understand that by using a suitable surfactant, the same type of polymer material can be dispersed in water and oil, respectively. That is to say, by using a suitable surfactant, the same type of polymer material can be made into a water-dispersible polymer material or an oil-dispersible polymer material, respectively. For example, those skilled in the art can appropriately select water-dispersible polyacrylonitrile or oil-dispersible polyacrylonitrile as the difficultly soluble polymer material in the first polymer material, or select water-dispersible polyacrylate or oil-dispersible polyacrylate as the difficultly soluble polymer material in the first polymer material.

If the solubility of the fluorinated polyolefin and/or chlorinated polyolefin polymer material such as PVDF or PVDC in NMP is 100%, the solubility of the preferred difficultly soluble polymer material in NMP is substantially no more than 30%. For example, the solubility of oil-dispersible polyacrylonitrile in NMP is about 8%, and that of oil-dispersible polyacrylate in NMP is 15%; the solubility of water-dispersible polymer materials such as water-dispersible polyacrylic acid, water-dispersible polyurethane, and water-dispersible polyvinyl alcohol in NMP is no more than 5%.

Since the addition of the water-dispersible polymer material as a difficultly soluble polymer material may increase the brittleness of the coating, which is disadvantageous to the improvement of the safety performance of the battery and to the improvement of the cycle life, it is preferred to add the oil-dispersible polymer material as a difficultly soluble polymer material.

When the first polymer material is a mixed material of a fluorinated polyolefin and/or chlorinated polyolefin polymer material with a difficultly soluble polymer material (preferably an oil-dispersible polymer material), based on the total weight of the underlying positive active material layer, the fluorinated polyolefin and/or chlorinated polyolefin polymer material generally has a content of B1% satisfying B1%≥17.5 wt %, preferably B1%≥20 wt %, more preferably B1%≥25 wt % (The content of the difficultly soluble polymer material can be easily determined from B %−B1%). It has been found that when the content B1% of the fluorinated polyolefin and/or chlorinated polyolefin polymer material is within the above preferred range, the underlying positive active material layer exerts a better effect on improving the nail penetration safety of the battery.

As a modification of another aspect of this application, the fluorinated polyolefin and/or chlorinated polyolefin polymer material in the first polymer material contained in the underlying positive active material layer is preferably subjected to crosslinking treatment. That is to say, the fluorinated polyolefin and/or chlorinated polyolefin polymer material is preferably a fluorinated polyolefin and/or chlorinated polyolefin having a crosslinked structure.

The crosslinking treatment may be more advantageous for hindering the adverse effects of a solvent (such as NMP or the like) in the upper positive active material layer or an electrolyte on the fluorinated polyolefin and/or chlorinated polyolefin polymer material in the first polymer material contained in the underlying positive active material layer, such as dissolving or swelling and the like, and for preventing cracking of the upper positive active material layer and the problem of battery DCR growth.

The procedure of the crosslinking treatment is known in the art. For example, for a fluorinated polyolefin and/or chlorinated polyolefin polymer matrix, the crosslinking treatment can be achieved by introducing an activator and a crosslinking agent. The function of the activator is to remove the HF or HCl from the fluorinated polyolefin and/or chlorinated polyolefin to form a C=C double bond; the crosslinking agent acts to crosslink the C=C double bond. As an activator, a strong base-weak acid salt such as sodium silicate or potassium silicate can be used. The weight ratio of the activator to the polymer matrix is usually from 0.5% to 5%. The crosslinking agent may be selected from at least one of polyisocyanates (JQ-1, JQ-1E, JQ-2E, JQ-3E, JQ-4, JQ-5, JQ-6, PAPI, emulsifiable MDI, tetraisocyanate), polyamines (propylenediamine, MOCA), polyols (polyethylene glycol, polypropylene glycol, trimethylolpropane), glycidyl ethers (polypropylene glycol glycidyl ether), inorganic substances (zinc oxide, aluminum chloride, aluminum sulfate, sulfur, boric acid, borax, chromium nitrate), organic substances (styrene, α-methylstyrene, acrylonitrile, acrylic acid, methacrylic acid, glyoxal, aziridine), organosilicons (tetraethyl orthosilicate, tetramethyl orthosilicate, trimethoxysilane), benzenesulfonic acids (p-toluenesulfonic acid, p-toluenesulfonyl chloride), acrylates (1,4-butylene glycol diacrylate, ethylene glycol dimethacrylate, TAC, butyl acrylate, HEA, HPA, HEMA, HPMA, MMA), organic peroxides (dicumyl peroxide, bis(2,4-dichlorobenzoyl) peroxide), and metal organic compounds (aluminum isopropoxide, zinc acetate, titanium acetylacetonate).

The weight ratio of the crosslinking agent to the fluorinated polyolefin and/or chlorinated polyolefin is from 0.01% to 5%. If too little crosslinking agent is used, the crosslinking degree of the fluorinated polyolefin and/or chlorinated polyolefin is low, and the cracking cannot be completely eliminated. If excessive crosslinking agent is used, it is easy to cause gel during stirring. The activator and the crosslinking agent may be added after the stirring of the slurry for preparing the underlying positive active material layer is completed, then performing the crosslinking reaction, the mixture is uniformly stirred and then coated to prepare an underlying positive active material layer.

Next, the inventors have found that the first positive active material in the underlying positive active material layer can function as an inorganic filler to stabilize the underlying positive active material layer.

It has been found that the first positive active material contained in the underlying positive active material layer can function to stabilize and improve the technical effect of the underlying positive active material layer as a binder layer and a PTC safety coating from the following three aspects:

(1) hindering the adverse effects of a solvent (such as NMP or the like) in the upper positive active material layer or an electrolyte on the fluorinated polyolefin and/or chlorinated polyolefin polymer material in the underlying positive active material layer, such as dissolving or swelling and the like; (2) beneficially ensuring that the underlying positive active material layer is not easily deformed during compaction process of electrode plate to avoid direct contact between the current collector and the upper positive active material layer; (3) improving the response speed and the like of the PTC effect of the underlying positive active material layer.

The first positive active material contained in the underlying positive active material layer corresponds to a barrier substance, thereby facilitating elimination of the adverse effects of a solvent (such as NMP or the like) in the upper positive active material layer or an electrolyte on the fluorinated polyolefin and/or chlorinated polyolefin polymer material contained in the underlying positive active material layer, such as dissolution and swelling and the like, and facilitating the stabilization of the underlying positive active material layer.

It has also been found that the presence of the first positive active material contained in the underlying positive active material layer is also advantageous for ensuring that the underlying positive active material layer is not easily deformed during the electrode plate compaction process. Therefore, it can be well ensured that the underlying positive active material layer is stably disposed between the current collector and the upper positive active material layer, and that the current collector is prevented from directly contacting with the upper positive active material layer, thereby improving the safety performance of the battery.

The inventors have also unexpectedly found that the presence of the first positive active material contained in the underlying positive active material layer can also improve the PTC response speed and the like of the underlying positive active material layer. The PTC action principle of the underlying positive active material layer is that: at normal temperature, the underlying positive active material layer conducts the electrons by virtue of a good conductive network formed between the first conductive materials; when the temperature increases, the volume of the first polymer material begins to expand, the spacing between the particles of the first conductive material increases, thus the conductive network is partially blocked, and the resistance of the underlying positive active material layer gradually increases; when a certain temperature (for example, the operating temperature) is reached, the conductive network is almost completely blocked, then the current approaches zero. However, in general, when a dynamic equilibrium is reached inside the underlying positive active material layer, the conductive network is partially recovered, so that after reaching a certain temperature (for example, the operating temperature), the resistance of the underlying positive active material layer is not large as expected, and still very small currents pass. The inventors have found that, in the presence of the first positive active material contained in the underlying positive active material layer, after the volume expansion of the first polymer material, the first positive active material and the first polymer material having an increased volume can act to block the conductive network. Therefore, in the operating temperature range, the underlying positive active material layer can better produce the PTC effect. That is to say, the resistance value increases faster at a high temperature, and thus the PTC response speed is faster. Thereby, the safety performance of the battery can be better improved.

Based on the total weight of the underlying positive active material layer, the content A % of the first positive active material generally satisfies 10 wt %≤A %≤60 wt %. If the content is too small, it is not enough to stabilize the underlying positive active material layer; if the content is too large, it will affect the PTC properties of the underlying positive active material layer. The content of the first positive active material is preferably from 15% by weight to 45% by weight.

The inventors have found that in addition to the first positive active material many other inorganic fillers can also have similar technical effects, for example, at least one of a metal oxide, a non-metal oxide, a metal carbide, a non-metal carbide, and an inorganic salt, or at least one of a conductive carbon coating modified above material, a conductive metal coating modified above material, or a conductive polymer coating modified above materials.

For example, the other inorganic filler may be selected from at least one of magnesium oxide, aluminum oxide, titanium dioxide, zirconium oxide, silicon dioxide, silicon carbide, boron carbide, calcium carbonate, aluminum silicate, calcium silicate, potassium titanate, and barium sulfate.

However, the inventors have found that using a positive electrode electrochemically active material (i.e., a first positive active material) or a conductive carbon coating modified, a conductive metal coating modified or a conductive polymer coating modified positive electrode electrochemically active material to replace other inorganic fillers has particular advantages. In this case, the first positive active material can also play the roles from the following two aspects: (1) to improve the overcharge performance of the battery. In the PTC safety coating system composed of the first polymer material and the first conductive material, due to that the electrochemically active material (i.e., a first positive active material) has the characteristics of lithium ion intercalation, the electrochemically active material can be used as an "active site" that participates in the conductive network at the normal operating temperature of the battery and thus the number of "active site" in the safety coating is increased. In the process of overcharging, the electrochemically active material will delithiate, and the delithiation process is becoming more and more difficult, and the impedance is increasing. Therefore, when the current passes, the heat-generating power increases, and the temperature of the primer layer increases faster, so the PTC effect responds faster, which in turn can generate PTC effects before the overcharge safety problem of battery occurs. Thus the battery overcharge safety performance may be improved; (2) to contribute charge and discharge capacity. Since the electrochemically active material (i.e., a first positive active material) can contribute a certain charge and discharge capacity at the normal operating temperature of the battery, the effect of the safety coating on the electrochemical performance such as capacity of the battery at the normal operating temperature can be dropped to the lowest.

The first positive active material may be selected from at least one of lithium cobalt oxide, lithium nickel manganese cobalt oxide, lithium nickel manganese aluminum oxide, lithium iron phosphate, lithium vanadium phosphate, lithium cobalt phosphate, lithium manganese phosphate, lithium manganese iron phosphate, lithium iron silicate, lithium vanadium silicate, lithium cobalt silicate, lithium manganese silicate, spinel lithium manganese oxide, spinel lithium nickel manganese oxide, lithium titanium oxide, or at least one of a conductive carbon coating modified above material, a conductive metal coating modified above material or a conductive polymer coating modified above material. The first positive active material is preferably at least one of lithium iron phosphate, lithium vanadium phosphate, lithium cobalt phosphate, lithium manganese phosphate, lithium manganese iron phosphate or at least one of a conductive carbon coating modified above material, a conductive metal coating modified above material or a conductive polymer coating modified above material. The reasons are as follows: (1) lithium iron phosphate, lithium vanadium phosphate, lithium cobalt phosphate, lithium manganese phosphate, lithium manganese iron phosphate and the like have high safety performance, and do not release oxygen when overcharged; (2) compared with lithium cobalt oxide, lithium nickel manganese cobalt oxide and the like, the resistance of the above materials increases more when overcharged, so that the undercoating layer (i.e., the underlying positive active material layer) generates more heat, thus the underlying positive active material layer "executes" PTC effect more quickly.

When the particle size of the first positive active material is too small, the specific surface area increases, and the side reaction increases; when the particle size is too large, the coating thickness of the underlying positive active material layer is too large and the thickness is uneven. Preferably, the average particle size D of the first positive active material in the underlying positive active material layer satisfies 100 nm≤D≤10 μm, and more preferably 1 μm≤D≤6 μm. When the particle size of the first positive active material is in the above range, the effect of blocking the conductive network at a high temperature can be improved, thereby improving the response speed of the underlying positive active material layer.

Still preferably, the first positive active material in the underlying positive active material layer has a specific surface area (BET) of no more than 500 $m^2/g$. When the specific surface area of the first positive active material increases, the side reaction may increase to affect the battery performance; and when the specific surface area of the first positive active material is too large, a higher proportion of binder is consumed, which may result in a decrease in the adhesion force between the underlying positive active material layer and the current collector and the upper positive active material layer, and the internal resistance growth rate is higher. When the specific surface area (BET) of the first positive active material is no more than 500 $m^2/g$, a better overall effect can be provided.

Third, the inventors have found that controlling the content of the first conductive material in the underlying positive active material layer contributes to further optimizing the safety performance of the underlying positive active material layer.

In addition to the first polymer material and the first positive active material, the underlying positive active material layer disposed between the current collector and the upper positive active material layer further comprises a first conductive material.

In this application, the content C % of the first conductive material generally satisfies 5 wt %≤C %≤25 wt %, preferably 5% wt≤% C %≤20 wt %, relative to the total weight of the underlying positive active material layer.

In addition, the weight ratio of the first conductive material to the first polymer material also has an effect on the correct functioning of the PTC layer. It has been found that, in the underlying positive active material layer, when all of the first polymer material is a fluorinated polyolefin and/or chlorinated polyolefin, it is preferred that the weight ratio of the first polymer material to the first conductive material is 2 or more, and the PTC effect is better at this time. When the first polymer material is a mixture of a fluorinated polyolefin and/or chlorinated polyolefin with an oil-dispersible polymer material (a difficultly soluble polymer material), preferably the weight ratio of the sum of the fluorinated polyolefin and/or chlorinated polyolefin and the oil-dispersible polymer material to the first conductive material is 2 or more, and the PTC effect is better at this time. When the first polymer material is a mixture of a fluorinated polyolefin and/or chlorinated polyolefin with a water-dispersible polymer material (a difficultly soluble polymer material), preferably the weight ratio of the sum of the fluorinated polyolefin and/or chlorinated polyolefin and the water-dispersible polymer material to the first conductive material is 2 or more.

If not satisfying the above weight ratio, the content of the first conductive material is relatively high, the conductive network may not be sufficiently disconnected when the temperature increases, thereby affecting the PTC effect. Moreover, within the above weight ratio, the nail penetration safety can be further improved.

If the weight ratio of the first polymer material to the first conductive material is too high, the content of the first conductive material will be relatively low, which may cause a large increase in the DCR of the battery during normal operation.

More preferably, the above weight ratio is 3 or more and 8 or less.

The first conductive material may be selected from at least one of a conductive carbon-based material, a conductive metal material, and a conductive polymer material, wherein the conductive carbon-based material is selected from at least one of conductive carbon black, acetylene black, graphite, graphene, carbon nanotubes and carbon nanofibers; the conductive metal material is selected from at least one of Al powder, Ni powder, and gold powder; and the conductive polymer material is selected from at least one of conductive polythiophene, conductive polypyrrole, and conductive polyaniline. The first conductive materials may be used alone or in combination of two or more The first conductive materials are typically used in the form of powders or granules. The particle size may be 5 nm to 500 nm, for example, 10 nm to 300 nm, 15 nm to 200 nm, 15 nm to 100 nm, 20 nm to 400 nm, 20 nm to 150 nm, or the like, depending on the specific application environment.

In addition to the first polymer material, the first conductive material, and the first positive active material, the underlying positive active material layer of this application may also comprise other materials or components, such as binder for promoting the adhesion between the underlying positive active material layer and the substrate used as the current collector, and the like. Those skilled in the art can select other additives according to actual needs. For example, in other embodiments of this application, the underlying positive active material layer may further comprise other binders.

In order to simplify the process and save cost, in a preferred embodiment of this application, the underlying positive active material layer is substantially free of other binders ("substantially free" means that the content is ≤3%, ≤1%, or ≤0.5%).

Furthermore, in some preferred embodiments of this application, the underlying positive active material layer of this application may consist essentially of the first polymer material, the first conductive material, and the first positive active material, i.e., it does not contain a significant amount (e.g., a content of ≤3%, ≤1%, or ≤0.5%) of other components.

The thickness H of the underlying positive active material layer can be appropriately determined according to actual needs, but preferably satisfies 1 μm≤H≤20 μm, more preferably 3 μm≤H≤10 μm.

(2) Upper Positive Active Material Layer

The upper positive active material layer of the positive electrode plate according to this application may be a commonly used positive active material layer for a lithium-ion battery, and also comprises a positive active material (a second positive active material), a binder (a second polymer material) and a conductive material (a second conductive material). The composition of the upper active material layer is the same as that of the conventional positive active material layer for the positive electrode plate in the prior art, and its constitution and preparation method are also well known in the art. However, this application has a limit on the content of each component in the upper positive active material layer. Based on the total weight of the upper positive active material layer, the content of the second positive active material is A'% by weight, the content of the second polymer material is B'% by weight, and the content of the second conductive material is C'% by weight, wherein it is necessary to satisfy: A %<A'%, B %>B'%, C %≥C'%.

A person skilled in the art can reasonably determine the range of A'%, B'%, C'% according to A %, B %, C % of the underlying positive active material layer. Their range may be, for example, as follows: the second positive active material satisfies 90 wt %≤A'%≤99 wt %, the second polymer material satisfies 0.5 wt %≤B'%≤5 wt %, and the second conductive material satisfies 0.5 wt %≤C'%≤5 wt %.

In this application, the types of the polymer material, the positive active material, and the conductive material used in the underlying positive active material layer and the upper positive active material layer may be different or may be the same (or partially the same).

As a positive active material in the upper positive active material layer, various positive active materials for preparing a lithium-ion secondary battery in the art can be used. For example, the positive active material is a lithium-containing composite metal oxide, and particularly for example, one or more of $LiCoO_2$, $LiNiO_2$, $LiMn_2O_4$, $LiFePO_4$, lithium nickel cobalt manganese oxide (such as $LiNi_{0.8}Co_{0.1}Mn_{0.1}O_2$) and lithium nickel manganese oxide.

The second polymer material (binder) in the upper positive active material layer may be, for example, a conventional binder such as PVDF, PVDC, SBR, CMC, polyacrylate, polycarbonate, polyethylene oxide or the like.

The second conductive material in the upper positive active material layer may be, for example, a conventional conductive agent such as at least one of conductive carbon black, acetylene black, graphite, graphene, carbon nanotubes, and carbon nanofibers.

(3) Current Collector

For the current collector, materials commonly used in the art can be used, preferably metal current collectors, for example metal flakes or metal foils such as stainless steel, aluminum, copper, titanium or the like. The metal current collector has a thickness of 4 μm to 16 μm.

Preferably, the current collector is a porous current collector (porous aluminum foil). The use of the porous aluminum foil can reduce the probability of metal burrs occurrence and further reduce the probability of a severe aluminothermic reaction due to abnormal conditions such as nail penetration, thereby further improve the safety of the battery. In addition, the use of porous aluminum foil can also improve the wetting of the electrode plate by electrolyte, and thereby improve the dynamic performance of the lithium-ion battery; while the underlying positive active material layer can cover the surface of the porous aluminum foil to prevent leakage of the upper active material layer during the coating process.

In addition, considering the nail penetration safety, the elongation at break of the current collector has a great influence on the safety of the battery. If the elongation at break of the current collector is too large, the metal burr is large, which is not conducive to improving the safety performance of the battery; if the elongation at break of the current collector is too small, it is prone to breakage during the processing of the electrode plate compaction or when the battery is squeezed or collided, which will reduce the quality or safety of a battery. Therefore, in order to further improve the safety, particularly nail penetration safety, the elongation at break δ of the current collector should be no more than 4% and not less than 0.8%. The elongation at break of the metal current collector can be adjusted by changing the purity of the metal current collector, the impurity content and the additive, the billet production process, the rolling speed, the heat treatment process, and the like.

The positive electrode plate of the battery according to this application can be formed by a conventional method. For example, the first positive active material, the first polymer material, the first conductive material, and optionally other auxiliary agents are dissolved in a solvent and stirred to form a slurry, and then the slurry is applied onto the current collector and heated, thus the underlying positive active material layer is obtained by drying. Then the second positive active material, the second polymer material, the second conductive material, and optionally other auxiliary agents are dissolved in a solvent and stirred to form a slurry, and then the slurry is applied onto the underlying positive active material layer, and heated, thus the upper positive active material layer is obtained by drying. Then, the current collector containing the underlying positive active material layer and the upper positive active material layer is subjected to post-treatment such as cold pressing, trimming, cutting and the like to obtain a desired positive electrode plate.

Those skilled in the art will appreciate that various definition or preferred ranges of the component selection, component content, and material physicochemical properties (thickness, particle size, specific surface area, elongation at break, etc.) in the various embodiments of the invention mentioned above can be combined arbitrarily. The combined embodiments are still within the scope of the invention and are considered as part of the disclosure.

(4) Battery According to This Application

The battery according this application comprises a positive electrode plate as described above, a separator, and a negative electrode plate. The negative electrode plate for use in conjunction with the positive electrode plate according to this application may be selected from various conventional negative electrode plates in the art, and the constitution and preparation method thereof are well known in the art. For example, the negative electrode plate may comprise a negative electrode current collector and a negative active material layer disposed on the negative electrode current collector, and the negative active material layer may comprise a negative active material, a binder, a conductive material, and the like. The negative active material is, for example, a carbonaceous material such as graphite (artificial graphite or natural graphite), conductive carbon black, carbon fiber, or the like, a metal or a semimetal material such as Si, Sn, Ge, Bi, Sn, In, or an alloy thereof, and lithium-containing nitride or lithium-containing oxide, lithium metal or lithium aluminum alloy.

The separator used in the battery of this application may be selected from various separators commonly used in the art.

The battery of the present invention typically also comprises an electrolyte. Various electrolytes commonly used in the art, such as solutions of electrolytic salts in non-aqueous solvents, may be used. For example, for a lithium battery, a mixed solution of an electrolytic lithium salt and a non-aqueous solvent can be used. The electrolytic lithium salt may be selected from one or more of lithium hexafluorophosphate ($LiPF_6$), lithium perchlorate, lithium tetrafluoroborate, lithium hexafluoroarsenate, lithium halide, lithium chloroaluminate, and lithium fluoroalkylsulfonate. The organic solvent may be selected from the group consisting of chain carbonates, cyclic carbonates, or a mixture thereof. The chain carbonate may be at least one of dimethyl carbonate (DMC), diethyl carbonate (DEC), ethyl methyl carbonate (EMC), methyl propyl carbonate (MPC), dipropyl carbonate (DPC), and a chain-like organic ester containing fluorine, containing sulfur or having an unsaturated bond. The cyclic carbonate may be one or more of ethylene carbonate (EC), propylene carbonate (PC), vinylene carbonate (VC), γ-butyrolactone (γ-BL), sultone and other cyclic organic ester containing fluorine, containing sulfur or having an unsaturated bond.

The battery of this application may be a primary battery or a secondary battery. The battery of this application may be a lithium-ion battery or a sodium-ion battery, preferably a lithium-ion battery, such as a lithium-ion primary battery or a lithium-ion secondary battery. In addition to the use of the positive electrode plate as described above, the construction and preparation methods of these batteries are known per se. Due to the use of the positive electrode plate as described above, the battery can have improved safety (e.g., nail penetration safety) and electrical properties. Furthermore, the positive electrode plate according to this application can be easily processed, so that the manufacturing cost of the battery using the positive electrode plate according to this application can be reduced.

DETAILED DESCRIPTION

In order to make the objects, the technical solutions and the beneficial technical effects of this application more clear, this application will be described in further detail below with reference to the embodiments. However, it is to be understood that the embodiments of this application are not intended to limit the invention, and the embodiments of the invention are not limited to the embodiments set forth herein. The experimental conditions not indicated in the examples may refer to conventional conditions, or the conditions recommended by the material supplier or equipment supplier.

1. Preparation Method

The electrodes and batteries in the respective examples and comparative examples were prepared as follows unless otherwise specified.

1.1 Preparation of Positive Electrode Plate

1) Coating of the Underlying Active Material Layer

A certain ratio of a first polymer material, a first conductive material, a first positive active material (or inorganic filler) was added to N-methyl-2-pyrrolidone (NMP) to obtain a slurry, which was uniformly stirred and then coated on both surfaces of the current collector, then the underlying positive active material layer was obtained after drying at 85° C.

If it was necessary to crosslink the first polymer material, an activator (sodium silicate) and a crosslinking agent were added after the slurry was obtained, and the mixture was uniformly stirred and then coated on both surfaces of the current collector.

2) Coating of the Upper Active Material Layer

Then, 90 wt % of a second positive active material, 5 wt % of SP (second conductive material), and 5 wt % of PVDF (second polymer material) were mixed with NMP as a solvent, uniformly stirred and then coated on the underlying positive active material layer of the current collector prepared according to the above method; then the upper positive active material layer was obtained after drying at 85° C.

3) Preparation of Electrode Plate

Then, the current collector with two layers of the positive active material was cold-pressed, then trimmed, cut, and stripped, and then dried under vacuum at 85° C. for 4 hours. After welding, the positive electrode plate meeting the requirements of the secondary battery was obtained.

The main materials used in the specific examples were as follows:

Fluorinated polyolefin and/or chlorinated polyolefin polymer material: PVDF (Manufacturer "Solvay", model 5130), PVDC (PVDF and PVDC materials used in the examples, unless otherwise noted, are not crosslinked);

Difficultly soluble polymer materials: oil-dispersible polyacrylonitrile, oil-dispersible polyacrylic acid, water-dispersible polyacrylic acid, water-dispersible polyurethane, water-dispersible polyvinyl alcohol;

The first conductive material (conductive agent): Super-P (TIMCAL, Switzerland, abbreviated as SP);

The first positive active material: lithium iron phosphate (abbreviated as LFP), carbon coating modified lithium iron phosphate (abbreviated as LFP/C), carbon coating modified lithium titanate (abbreviated as $Li_4Ti_5O_{12}$/C);

Inorganic filler: alumina;

Crosslinking agent: acrylonitrile, tetraisocyanate, polyethylene glycol;

The second positive active material: NCM811 ($LiNi_{0.8}Co_{0.1}Mn_{0.1}O_2$).

The above materials were commonly used materials in the lithium battery industry and could be commercially available from the corresponding suppliers.

1.2 Preparation of Negative Electrode Plate

Negative electrode plate was prepared as follows: the active material graphite, conductive agent Super-P, thickener CMC, binder SBR were added to the solvent deionized water at a mass ratio of 96.5:1.0:1.0:1.5 to form an anode slurry; then the slurry was coated on the surface of the negative electrode current collector copper foil, and dried at 85° C., then trimmed, cut, and stripped, and then dried under vacuum at 110° C. for 4 hours. After welding, the negative electrode plate meeting the requirements of the secondary battery was obtained.

1.3 Preparation of Electrolyte

Ethylene carbonate (EC), ethyl methyl carbonate (EMC), and diethyl carbonate (DEC) were mixed at a volume ratio of 3:5:2 to obtain an EC/EMC/DEC mixed solvent, followed by dissolving the fully dried lithium salt $LiPF_6$ into a mixed organic solvent at a concentration of 1 mol/L to prepare an electrolyte.

1.4 Preparation of the Battery

A polypropylene film with a thickness of 12 μm was used as a separator, and the positive electrode, the separator and the negative electrode were stacked in order, so that the separator was sandwiched in between the positive electrode plate and the negative electrode plate, and then the stack was wound into a bare battery core. After vacuum baking at 75° C. for 10 h, the electrolyte (prepared as described in "1.3 Preparation of electrolyte" above) was injected therein followed by vacuum package and standing for 24 h. After that, the battery core was charged to 4.2 V with a constant current of 0.1 C, and then was charged with a constant voltage of 4.2 V until the current dropped to 0.05C, and then was discharged to 3.0V with a constant current of 0.1C. Above charging and discharging processes were repeated twice. Finally, the battery core was charged to 3.8V with a constant current of 0.1C, thereby completing the preparation of the secondary battery.

2. Tests for Material Performances

In each of the examples and comparative examples, the physical property parameters of the materials were measured by a commonly known method in the art, unless otherwise specified.

Some specific parameters were tested using the following methods.

2.1 Particle Size

The power sample was dispersed in a dispersion medium (distilled water), which was measured with a Malvern laser particle size analyzer MS2000 for 5 times and averaged in unit of μm.

2.2 BET (Specific Surface Area)

The specific surface area of the powder sample of the test material was measured with a Quadrasorb SI specific surface tester for 5 times and averaged in unit of $m^2/g$.

2.3 The Adhesion Force Between the Film Layer and the Current Collector

The electrode plate containing a current collector having a film layer on both sides was cut into a sample to be tested having a width of 2 cm and a length of 15 cm. One side of the sample to be tested was uniformly pasted on a stainless steel plate at 25° C. under normal pressure by using 3M double-sided tape. One end of the sample to be tested was fixed on a GOTECH tensile machine, and the film layer of the sample to be tested was stripped from the current collector by using the GOTECH tensile machine, wherein the maximum tensile force was read according to the data diagram of the tensile force and the displacement. The resulting value (in unit N) was divided by 0.02 to calculate the adhesion force (N/m).

2.4 Elongation at Break of Current Collector

Two samples having a length of 200 mm and a width of 15 mm were taken from the current collector. The sample was then mounted on a tensile machine (model AI7000) and the average of the two tests was used as the test result. Record the initial length L0, and start the tensile machine, until the sample broke, and read the displacement L1 of the sample at the time of the break from the tensile machine. Elongation at break=(L1−L0)/L0*100%.

2.5 Thickness of the Current Collector, Thickness of the Coating and Thickness of the Film Layer Thickness of the current collector was measured by a micrometer, and the average value of 5 points was used.

Thickness of the coating and thickness of the film layer: first measure the thickness of the current collector, and then measure the total thickness after coating, and use the difference between the two values as the coating thickness. A similar method was used for the thickness of the film layer.

2.6 Cracking of the Coating

After drying and obtaining a positive active material layer, if no cracks were observed in the 100 $m^2$ electrode plate, it was defined as no cracking; if the number of occurrences of cracks in 100 $m^2$ electrode plate was it was defined as mild cracking; if the number of occurrences of cracks in 100 $m^2$ electrode plate was >3, it was defined as severe cracking.

2.7 Solubility of Polymer Materials in Oil Solvents

The polymer material was made into a film having a thickness of about 7 μm, then cut into 20 mm*50 mm strips, weighed and recorded as M1;

The film was placed in NMP (N-methylpyrrolidone) solvent, placed at 130° C. for 5 min, taken out, and vacuum dried at 100° C.; after drying, it was weighed and recorded as M2;

Then solubility was calculated as =(M1−M2)/M1*100%

In this application, for convenience of comparison, the solubility of PVDF (manufacturer "Solvay", model 5130)

was used as a reference, and it was recorded as 100%, and the ratio of the solubility of other materials to the solubility of PVDF was recorded.

3. Test for Battery Performance

The safety performances of the secondary batteries from various examples and comparative examples were evaluated using GBT31485-2015 "Safety Requirements and Test Methods for Traction Battery of Electric Vehicle", and the test results were recorded.

3.1 Puncture Test:

The secondary battery was fully charged to the charging cut-off voltage with a current of 1 C, and then charged with a constant voltage until the current dropped to 0.05 C. After that, charging was terminated. A high temperature resistant steel needle of φ5-10 mm (the tip thereof had a cone angle of 45°) was used to puncture the battery plate at a speed of 25 mm/s in the direction perpendicular to the battery plate. The puncture position should be close to the geometric center of the surface to be punctured, the steel needle stayed in the battery, and then observe if the battery had an indication of burning or exploding.

3.2 Overcharge Test:

The secondary battery was fully charged to the charging cut-off voltage with a current of 1 C, and then charged with a constant voltage until the current dropped to 0.05 C. After that, charging was terminated. Then, after charging with a constant current of 1 C to reach 1.5 times the charging cut-off voltage or after charging for 1 hour, the charging was terminated.

3.3 Cycle Performance Test:

The test conditions of the cycle number were as follows: the secondary battery was subjected to a 1C/1C cycle test at 25° C. in which the charging and discharging voltage range was 2.8 to 4.2 V. The test was terminated when the capacity was attenuated to 80% of the first discharging specific capacity.

3.4 PTC Effect Test

The secondary battery was fully charged to the charging cut-off voltage with a current of 1 C, and then charged with a constant voltage until the current was reduced to 0.05 C. After that, the charging was terminated and the DC resistance of the battery was tested (discharging with a current of 4 C for 10 s). Then, the battery core was placed at 130° C. for 1 h followed by testing the DC resistance, and calculating the DC resistance growth rate. Then, the battery core was placed at 130° C. for 2 h followed by testing the DC resistance, and calculating the DC resistance growth rate.

3.5 DCR Test

The secondary battery was adjusted to 50% SOC with a current of 1 C at 25° C., and the voltage U1 was recorded. Then, it was discharged with a current of 4 C for 30 seconds, and the voltage U2 was recorded. DCR=(U1−U2)/4C.

In this application, for convenience of comparison, the DCR of the battery core in which the first polymer material contained only non-crosslinked PVDF as the polymer matrix was used as a reference, and was recorded as 100%, and the DCR of the other battery cores and the ratio thereof were calculated and recorded.

4. Performance Test Results 4.1 Effect of Underlying Active Material Layer on Nail Penetration Performance of the Battery The corresponding positive electrode plate, negative electrode plate and battery were prepared with the specific materials and amounts listed in Table 1-1 below according to the methods and procedures described in "1. Preparation method", and were tested according to the method specified in "3. Tests for battery performance". In order to ensure accuracy of data, 4 samples were prepared for each battery (10 samples for the puncture test) and tested independently. The final test results were averaged and shown in Table 1-2 and Table 1-3.

In the test, the conventional electrode plate CPlate N was prepared with the method described in "1.2 Preparation of negative electrode plate"; each positive electrode plate except the conventional electrode plate CPlate P, comparative electrode plate 1 and comparative electrode plate 2, was prepared with the method described in "1.1 Preparation of positive electrode plate", but the underlying positive active material layer was not provided, that is to say, only comprising the upper positive active material layer; the comparative electrode plate 1 (hereafter abbreviate as Comp. Plate 1) was basically prepared according to the method described in "1.1 Preparation of positive electrode plate", but the first positive active material was not added to the underlying positive active material layer; the comparative electrode plate 2 (hereafter abbreviate as Comp. Plate 2) was basically prepared according to the method described in "1.1 Preparation of positive electrode plate", but the inorganic filler alumina was used to replace the first positive active material.

TABLE 1-1

| | | | Composition of electrode plate | | | | | | | |
| --- | --- | --- | --- | --- | --- | --- | --- | --- | --- | --- |
| | | | Composition of the underlying positive active material layer | | | | | | | |
| | Current collector | The second positive active material | The first polymer material | wt % | The first conductive material | wt % | The first positive active polymer material | wt % | Thickness of the underlying layer H (μm) | Adhesion force between the positive electrode film layer and current collector (N/m) |
| CPlate P | Al foil | NCM811 | / | / | / | / | / | / | / | / |
| Comp. Plate 1 | Al foil | NCM811 | PVDF | 90 | SP | 10 | / | / | 20 | / |
| Comp. Plate 2 | Al foil | NCM811 | PVDC | 35 | SP | 10 | Alumina | 55 | 10 | 80 |
| Plate 1-1 | Al foil | NCM811 | PVDF | 35 | SP | 10 | LFP | 55 | 3 | 100 |

TABLE 1-2

Performance of lithium-ion battery

| Battery No. | Positive electrode plate | Negative electrode plate | Puncture Test |
|---|---|---|---|
| Battery 1 | CPlate P | CPlate N | 10 fail |
| Battery 2 | Comp. Plate 1 | CPlate N | 2 pass and 8 fail |
| Battery 3 | Comp. Plate 2 | CPlate N | 10 pass |
| Battery 4 | Plate 1-1 | CPlate N | 10 pass |

TABLE 1-3

Performance of lithium-ion battery

| Battery No. | Positive electrode plate | Negative electrode plate | DC resistance growth rate@130° C., 1 h | DC resistance growth rate@130° C., 2 h |
|---|---|---|---|---|
| Battery 2 | Comp. Plate 1 | CPlate N | 20% | 30% |
| Battery 4 | Plate 1-1 | CPlate N | 1200% | 1500% |

The data in Table 1-1 and Table 1-2 indicated that when PVDF or PVDC was used as the first polymer material (polymer matrix) and in the presence of the first positive active material or other inorganic filler such as alumina, the adhesion force between the film layer and the current collector was greater than 10 N/m, which could greatly improve the needle-puncture performance of the battery. This also indicated that the underlying positive active material layer with higher PVDF or PVDC content could function as a binder layer. When an abnormal situation such as needle puncture or nailing occurred, metal burrs that might be generated in the current collector could be wrapped, thereby effectively preventing the occurrence of internal short circuit of battery.

The data in Table 1-1 and Table 1-3 showed that when the underlying positive active material layer contained a higher content of PVDF and contained a conductive material, the DC resistance increased when the temperature increased, i.e. having a PTC effect; especially when the underlying positive active material layer contained a relatively high content of PVDF and contained both a conductive material and a positive active material, the DC resistance growth rate was very remarkable. This indicated that when PVDF or PVDC was used as the first polymer material (polymer matrix) and in the presence of the first positive active material and the conductive material, the underlying positive active material layer had a remarkable PTC effect, which could improve the safety performance of the battery significantly.

In summary, in the positive electrode plate of the battery according to this application, the underlying positive active material layer simultaneously exerted the technical effects of the binder layer and the PTC safety coating, thereby greatly improving the nail-penetration safety performance of the battery.

4.2 Effect of the Content of Each Component Contained in the Underlying Positive Active Material Layer Next, the effect of the content of each component contained in the underlying positive active material layer will be further studied. Since the technical effects and laws of other inorganic fillers such as alumina and the first positive active material were substantially the same in the "Puncture test", in order to simplify the experiment, alumina was used instead of the first positive active material to illustrate the effect of each component on the underlying positive active material layer.

The corresponding positive electrode plate, negative electrode plate and battery were prepared with the specific materials and amounts listed in Table 2-1 below according to the methods and procedures described in "1. Preparation method", and then were tested according to the method specified in "3. Test for battery performance". In order to ensure the accuracy of data, 4 samples were prepared for each battery (10 samples for the puncture test) and tested independently. The final test results were averaged and shown in Table 2-2.

TABLE 2-1

Composition of electrode plate

| | Current collector | The second positive active material | The first polymer material | wt % | The first conductive material | wt % | Other inorganic filler | wt % | Thickness of the underlying layer H (μm) | Adhesion force between the positive electrode film layer and current collector (N/m) |
|---|---|---|---|---|---|---|---|---|---|---|
| Comp. Plate 2-1 | Al foil | NCM811 | PVDF | 75 | SP | 20 | Alumina | 5 | 8 | 160 |
| Plate 2-2 | Al foil | NCM811 | PVDF | 75 | SP | 15 | Alumina | 10 | 8 | 170 |
| Plate 2-3 | Al foil | NCM811 | PVDF | 75 | SP | 10 | Alumina | 15 | 8 | 180 |
| Plate 2-4 | Al foil | NCM811 | PVDF | 60 | SP | 10 | Alumina | 30 | 8 | 135 |
| Plate 2-5 | Al foil | NCM811 | PVDF | 60 | SP | 8 | Alumina | 32 | 8 | 140 |
| Plate 2-6 | Al foil | NCM811 | PVDF | 55 | SP | 15 | Alumina | 30 | 8 | 120 |
| Plate 2-7 | Al foil | NCM811 | PVDF | 50 | SP | 25 | Alumina | 25 | 8 | 110 |
| Plate 2-8 | Al foil | NCM811 | PVDF | 40 | SP | 15 | Alumina | 45 | 8 | 95 |
| Plate 2-9 | Al foil | NCM811 | PVDF | 35 | SP | 5 | Alumina | 60 | 8 | 75 |
| Comp. Plate 2-10 | Al foil | NCM811 | PVDF | 25 | SP | 5 | Alumina | 70 | 8 | 50 |

TABLE 2-2

Performance of lithium-ion battery

| Battery | Positive electrode | Negative electrode | Puncture Test | Cycle Life (cycle) |
|---|---|---|---|---|
| Battery 6 | Comp. Plate 2-1 | CPlate N | 5 fail, 5 pass | 2502 |
| Battery 7 | Plate 2-2 | CPlate N | 10 pass | 2351 |
| Battery 8 | Plate 2-3 | CPlate N | 10 pass | 2205 |
| Battery 9 | Plate 2-4 | CPlate N | 10 pass | 2251 |

TABLE 2-2-continued

Performance of lithium-ion battery

| Battery | Positive electrode | Negative electrode | Puncture Test | Cycle Life (cycle) |
|---|---|---|---|---|
| Battery 10 | Plate 2-5 | CPlate N | 10 pass | 2000 |
| Battery 11 | Plate 2-6 | CPlate N | 10 pass | 2408 |
| Battery 12 | Plate 2-7 | CPlate N | 10 pass | 2707 |
| Battery 13 | Plate 2-8 | CPlate N | 10 pass | 2355 |
| Battery 14 | Plate 2-9 | CPlate N | 10 pass | 1800 |
| Battery 15 | Comp. Plate 2-10 | CPlate N | 4 fail, 6 pass | 1715 |

The data in Table 2-1 and Table 2-2 demonstrated that: (1) if the content of other inorganic filler/first positive active material was too low, the stability of the underlying positive active material layer was not sufficiently high, so the safety performance of the battery could not be fully improved; and if the content of other inorganic filler/first positive active material was too high, the content of the first polymer material was too low and the effect thereof could not be exerted effectively, either; in addition, when the content of the first polymer material was too low, the underlying positive active material layer could not effectively wrap the aluminum burr, thus the needle-puncture safety performance was greatly deteriorated. (2) The conductive material had a great influence on the internal resistance and polarization of the battery, thus affected the cycle life of the battery. The higher the content of the conductive material was, the smaller the internal resistance and polarization of the battery were, and the better the cycle life was.

After carrying out experiments, it was found that the suitable content range of each component of the safety coating was as follows: the content of the first polymer material was from 35 wt % to 75 wt %; the content of the first conductive material was from 5 wt % to 25 wt %; and the content of other inorganic filler/first positive active material was from 10 wt % to 60 wt %.

As long as the content of each component was within the above range, the effect of improving the nail penetration safety and electrical properties (e.g., cycle performance) of the battery can be achieved.

4.3 Effect of Inorganic Filler Types on Battery Performance

In order to further study the effect of material selection in the underlying positive active material layer on the electrode plate and the performance of the battery, the corresponding positive electrode plate, negative electrode plate and battery were prepared with the specific materials and amounts listed in Table 3-1 below according to the methods and procedures described in "1. Preparation method", and were tested according to the method specified in "3. Test for battery performance". In order to ensure accuracy of data, 4 samples were prepared for each battery (10 samples for the puncture test) and tested independently. The final test results were averaged which were shown in Table 3-2.

The data in Table 3-1 and Table 3-2 demonstrated that the electrochemically active material (i.e., the first positive active material) could significantly improve the overcharge safety of the battery compared with other inorganic fillers (such as alumina); in addition, the carbon coated electrochemically active material also improved the cycle life of the battery. Therefore, although other inorganic fillers such as alumina and the electrochemically active material had similar effects on stabilizing the underlying positive active material layer and improving the nail penetration safety, when using the electrochemically active material (i.e., the first positive active material) to replace other inorganic fillers, the performance of the battery such as overcharge safety could be improved. Therefore it was preferable to use the first positive active material in the underlying positive active material layer, in particular lithium iron phosphate, lithium vanadium phosphate, lithium cobalt phosphate, lithium manganese phosphate, and lithium manganese iron phosphate, etc were preferred.

TABLE 3-1

Composition of electrode plate

Composition of the underlying positive active material layer

| | Current collector | The second positive active material | The first polymer material | | The first conductive material | | Other inorganic filler | | Carbon content (wt %) | Thickness of the underlying layer H (μm) | Adhesion force between the positive electrode film layer and current collector |
|---|---|---|---|---|---|---|---|---|---|---|---|
| | | | material | wt % | material | wt % | material | wt % | | | |
| Plate 2-41 | Al foil | NCM811 | PVDF | 60 | SP | 10 | alumina | 30 | / | 8 | 135 |
| Plate 2-42 | Al foil | NCM811 | PVDF | 60 | SP | 10 | LFP | 30 | / | 8 | 155 |
| Plate 2-43 | Al foil | NCM811 | PVDF | 60 | SP | 10 | LFP/C | 30 | 1 | 8 | 155 |
| Plate 2-44 | Al foil | NCM811 | PVDF | 60 | SP | 10 | LFP/C | 30 | 2 | 8 | 150 |
| Plate 2-45 | Al foil | NCM811 | PVDF | 60 | SP | 10 | LFP/C | 30 | 3 | 8 | 147 |
| Plate 2-46 | Al foil | NCM811 | PVDF | 60 | SP | 10 | $Li_4Ti_5O_{12}/C$ | 30 | 5 | 8 | 143 |

TABLE 3-2

Performance of lithium-ion battery

| Battery | Positive electrode | Negative electrode | Puncture Test | Overcharge Test | Cycle test (cycle) |
|---|---|---|---|---|---|
| Battery 46 | Plate 2-41 | CPlate N | 10 pass | 10 fail | 2200 |
| Battery 47 | Plate 2-42 | CPlate N | 10 pass | 10 pass | 2300 |
| Battery 48 | Plate 2-43 | CPlate N | 10 pass | 10 pass | 2500 |
| Battery 49 | Plate 2-44 | CPlate N | 10 pass | 10 pass | 2700 |
| Battery 50 | Plate 2-45 | CPlate N | 10 pass | 10 pass | 2900 |
| Battery 51 | Plate 2-46 | CPlate N | 10 pass | 10 pass | 3000 |

4.4 Effect of Crosslinking on Battery Performance

The corresponding positive electrode plate, negative electrode plate and battery were prepared with the specific materials and amounts listed in Table 4-1 below according to the methods and procedures described above, and were tested according to the specified method to study the effect of the crosslinking of the first polymer material on coating cracking and DCR, the results were shown in Table 4-2.

In the case where the coating speed of the upper positive active material layer was 50 m/min, for the electrode plate 2-51, the first polymer material was not crosslinked by adding a crosslinking agent, and the electrode plate was severely cracked. The addition of a crosslinking agent had a significant effect on improving the cracking of the electrode plate. No cracking occurred in the electrode plate 2-53 to the electrode plate 2-56. Similar experiments were performed for PVDC (electrode plates 2-57 and 2-58) and the results were similar. It can be seen that the addition of the crosslinking agent can significantly eliminate the coating cracking of the electrode plate.

For the electrode plate 2-51, the first polymer material was not crosslinked by adding a crosslinking agent, and the first polymer material swelled greatly in the electrolyte, resulting in a large DCR. The addition of the crosslinking agent can reduce the swelling of the first polymer material in the electrolyte, and had a significant effect on reducing DCR. It can be seen that the addition of the crosslinking agent can significantly reduce the DCR of the battery.

In addition, the above data indicated that PVDF/PVDC can be used as the first polymer material regardless of crosslinking, and the underlying positive active material layer had a PTC effect, and the obtained battery had high safety (excellent test results of puncture test). It indicated that the crosslinking treatment did not adversely affect the protective effect of the underlying positive active material layer. Furthermore, compared with the uncrosslinked PVDC/PVDF, the crosslinking treatment improved the cracking of the electrode plate, from severe cracking to no cracking or mild cracking. The crosslinking treatment can reduce the swelling of the first polymer material in the electrolyte, thereby reducing the DCR by 15% to 25%, thereby improving the electrical properties of the battery.

TABLE 4-2

| | Performance of lithium-ion battery | | | |
|---|---|---|---|---|
| Battery | Positive electrode | Negative electrode | DCR of the battery | Puncture Test |
| Battery 52 | Plate 2-51 | CPlate N | 100% | 10 pass |
| Battery 53 | Plate 2-52 | CPlate N | 80% | 10 pass |
| Battery 54 | Plate 2-53 | CPlate N | 85% | 10 pass |
| Battery 55 | Plate 2-54 | CPlate N | 78% | 10 pass |
| Battery 56 | Plate 2-55 | CPlate N | 75% | 10 pass |
| Battery 57 | Plate 2-56 | CPlate N | 84% | 10 pass |

4.5 Effect of the First Polymer Material Type on Battery Performance

The corresponding positive electrode plate, negative electrode plate and battery were prepared with the specific materials and amounts listed in Table 5-1 below according to the methods and procedures described above, and were tested according to the specified method to study the effect of the composition of the first polymer material on the cracking of the coating, etc., and the results were shown in Table 5-2.

The data in Table 5-1 and Table 5-2 showed that when the underlying positive active material layer did not contain a difficultly soluble polymer material (i.e. a polymer material having a solubility in an oil solvent smaller than that of a fluorinated polyolefin), the electrode plate was prone to cracking. After the addition of the difficultly soluble polymer material, no cracking occurred. This was because that the difficultly soluble polymer material used as the "difficultly soluble component" greatly reduced the dissolution and swelling of the PVDF-based polymer material contained in the underlying positive active material layer caused by the organic oil solvent in the upper active material slurry, thereby reducing cracking and significantly increasing production efficiency. Moreover, after the addition of the difficultly soluble polymer material, the battery's DCR was

TABLE 4-1

Effect of crosslinking agent

| | | Composition of the underlying positive active material layer | | | | | | | | |
|---|---|---|---|---|---|---|---|---|---|---|
| | Current collector | The second positive active material | The first polymer material | wt % | The first conductive material | wt % | The first positive active material | wt % | Crosslinking agent type | Ratio to the polymer material | Thickness of the underlying layer H (μm) | Cracking (coating speed (50 m/min) |
| Plate 2-51 | Al foil | NCM811 | Uncrosslinked PVDF | 60 | SP | 10 | LFP/C | 30 | No | 0 | 8 | Severe cracking |
| Plate 2-52 | Al foil | NCM811 | Crosslinked PVDF | 60 | SP | 10 | LFP/C | 30 | Acrylonitrile | 0.01% | 8 | Mild cracking |
| Plate 2-53 | Al foil | NCM811 | Crosslinked PVDF | 60 | SP | 10 | LFP/C | 30 | Tetraisocyanate | 0.1% | 8 | No cracking |
| Plate 2-54 | Al foil | NCM811 | Crosslinked PVDF | 60 | SP | 10 | LFP/C | 30 | Polyethylene glycol | 0.5% | 8 | No cracking |
| Plate 2-55 | Al foil | NCM811 | Crosslinked PVDF | 60 | SP | 10 | LFP/C | 30 | Acrylonitrile | 1.5% | 8 | No cracking |
| Plate 2-56 | Al foil | NCM811 | Crosslinked PVDF | 60 | SP | 10 | LFP/C | 30 | Acrylonitrile | 5% | 8 | No cracking |
| Plate 2-57 | Al foil | NCM811 | Uncrosslinked PVDC | 60 | SP | 10 | LFP/C | 30 | No | 0 | 8 | Severe cracking |
| Plate 2-58 | Al foil | NCM811 | Crosslinked PVDC | 60 | SP | 10 | LFP/C | 30 | Acrylonitrile | 3% | 8 | No cracking | significantly reduced. It can be seen that the introduction of difficultly soluble polymer materials can significantly reduce the DCR of the battery.

Moreover, in the case where a difficultly soluble polymer material was added, the result of the puncture test was still greatly improved as compared with the conventional positive electrode plate. This indicated that when the combination of PVDC and/or PVDF-based polymer materials and difficultly soluble polymer materials was used as the first polymer material, the battery's safety performance was still excellent, and the battery's DCR was improved, and the quality stability and production efficiency of the electrode plate was improved, so the overall performance of the battery was better.

TABLE 5-1

Composition of electrode plate

| | | | | Composition of the underlying positive active material layer | | | | | | | |
|---|---|---|---|---|---|---|---|---|---|---|---|
| | | | The first polymer material | | | | | The first positive active material | | | Thickness |
| | The second positive active material | | | difficultly soluble polymer material | | The first conductive material | | | | Carbon content | of the underlying layer H |
| Polarity of the electrode plate | | Fluorinated polyolefin | (wt %) (B1) | | (wt %) | material | (wt %) | material | (wt %) | (wt %) | (μm) |
| Plate 2-61 | Positive | NCM811 | PVDF | 60 | / | / | SP | 10 | LFP/C | 30 | 1 | 8 |
| Plate 2-62 | Positive | NCM811 | PVDF | 50 | Water-dispersible polyacrylic acid | 10 | SP | 10 | LFP/C | 30 | 1 | 8 |
| Plate 2-63 | Positive | NCM811 | PVDF | 40 | Water-dispersible polyurethane | 20 | SP | 10 | LFP/C | 30 | 1 | 8 |
| Plate 2-64 | Positive | NCM811 | PVDF | 30 | Water-dispersible polyvinyl alcohol | 30 | SP | 10 | LFP/C | 30 | 1 | 8 |
| Plate 2-65 | Positive | NCM811 | PVDF | 40 | Oil-dispersible polyacrylate | 20 | SP | 10 | LFP/C | 30 | 1 | 8 |
| Plate 2-66 | Positive | NCM811 | PVDF | 30 | Oil-dispersible polyacrylate | 30 | SP | 10 | LFP/C | 30 | 1 | 8 |
| Plate 2-67 | Positive | NCM811 | PVDF | 25 | Oil-dispersible polyacrylic acid | 35 | SP | 10 | LFP/C | 30 | 1 | 8 |
| Plate 2-68 | Positive | NCM811 | PVDF | 20 | Oil-dispersible polyacrylic acid | 40 | SP | 10 | LFP/C | 30 | 1 | 8 |

TABLE 5-2

Performance of lithium-ion battery

| Battery | Positive electrode | Negative electrode | Puncture Test | Cracking (coating speed 50 m/min) | DCR of the battery |
|---|---|---|---|---|---|
| Battery 61 | Plate 2-61 | CPlate N | 10 pass | Severe craking | 100% |
| Battery 62 | Plate 2-62 | CPlate N | 9 pass, 1 fails | No cracking | 55% |
| Battery 63 | Plate 2-63 | CPlate N | 8 pass, 2 fail | No cracking | 50% |
| Battery 64 | Plate 2-64 | CPlate N | 7 pass, 3 fail | No cracking | 40% |
| Battery 65 | Plate 2-65 | CPlate N | 10 pass | No cracking | 90% |
| Battery 66 | Plate 2-66 | CPlate N | 10 pass | No cracking | 70% |
| Battery 67 | Plate 2-67 | CPlate N | 10 pass | No cracking | 64% |
| Battery 68 | Plate 2-68 | CPlate N | 10 pass | No cracking | 60% |

4.6 Effect of the Binder/Carbon Ratio on Battery Performance

In order to further study the effect of the binder/carbon ratio (the weight ratio of the first polymer material to the first conductive material) on the performance of the electrode and the battery, the corresponding positive electrode plate, negative electrode plate and battery were prepared with the specific materials and amounts listed in Table 6-1 below according to the methods and procedures described above, and were tested according to the specified method to study the effect of the binder/carbon ratio on the cracking of the coating, etc., and the results were shown in Table 6-2.

application are only exemplified to be used for a lithium battery, but the electrode plate of this application can also be applied to other types of batteries or electrochemical devices, and still may produce good technical effect of this application.

It will be apparent to those skilled in the art that the present application may be modified and varied in accor-

TABLE 6-1

Composition of electrode plate

| | | Composition of the underlying positive active material layer | | | | | | | | |
|---|---|---|---|---|---|---|---|---|---|---|
| | | | | | | The first conductive material | | The first positive active material | | |
| | Current collector | The second positive active material | The first polymer material | (wt %) | material | (wt %) | the weight ratio of the first polymer material to the first conductive material | material | (wt %) | Carbon content (wt %) | Thickness of the underlying layer H (μm) |
| Plate 2-71 | Al foil | NCM811 | Uncrosslinked PVDF | 35 | SP | 35 | 1 | LFP/C | 30 | 3 | 8 |
| Plate 2-72 | Al foil | NCM811 | Uncrosslinked PVDF | 40 | SP | 30 | 1.3 | LFP/C | 30 | 3 | 8 |
| Plate 2-73 | Al foil | NCM811 | Uncrosslinked PVDF | 47 | SP | 23 | 2 | LFP/C | 30 | 3 | 8 |
| Plate 2-74 | Al foil | NCM811 | Uncrosslinked PVDF | 52.5 | SP | 17.5 | 3 | LFP/C | 30 | 3 | 8 |
| Plate 2-75 | Al foil | NCM811 | Uncrosslinked PVDF | 56 | SP | 14 | 4 | LFP/C | 30 | 3 | 8 |
| Plate 2-76 | Al foil | NCM811 | Uncrosslinked PVDF | 63 | SP | 7 | 9 | LFP/C | 30 | 3 | 8 |

TABLE 6-2

Performance of lithium-ion battery

| Battery | Positive electrode | Negative electrode | Puncture Test | Cycle Test (cycle) |
|---|---|---|---|---|
| Battery 71 | Plate 2-71 | CPlate N | 10 pass | 2200 |
| Battery 72 | Plate 2-72 | CPlate N | 8 pass, 2 fails | 2300 |
| Battery 73 | Plate 2-73 | CPlate N | 10 pass | 2900 |
| Battery 74 | Plate 2-74 | CPlate N | 10 pass | 2700 |
| Battery 75 | Plate 2-75 | CPlate N | 10 pass | 2500 |
| Battery 76 | Plate 2-76 | CPlate N | 10 pass | 900 |

The data in Table 6-1 and Table 6-2 showed that the relative amount of the first polymer material and the first conductive material was important for the correct function of the underlying positive active material layer. When the weight ratio of the first polymer material to the first conductive material was greater than or equal to 2, the underlying positive active material layer could function properly, the PTC effect was remarkable, and all the puncture test passed. When the weight ratio of the first polymer material to the first conductive material was less than 2, the relative content of the first polymer material was low, thus the aluminum burr could not be completely covered, and not all the puncture test passed.

When the weight ratio of the first polymer material to the first conductive material was more than 8, although all the puncture test passed, the battery cycle performance was drastically deteriorated due to the poor conductivity of the underlying positive active material layer, and the normal temperature cycle can only be maintained at 900 cycles.

It will be understood by those skilled in the art that the above application examples of the electrode plate of this dance with the above teachings. Accordingly, the present application is not limited to the specific embodiments disclosed and described above, and modifications and variations of the present application are intended to be included within the scope of the claims of the present application. In addition, although some specific terminology is used in this specification, these terms are for convenience of illustration only and are not intended to limit the present application in any way.

What is claimed is:

1. A battery comprising a positive electrode plate, a separator, and a negative electrode plate, wherein the positive electrode plate comprises a positive electrode current collector and at least two layers of positive active material coated on at least one surface of the positive electrode current collector, comprising an underlying positive active material layer in contact with the positive electrode current collector and an upper positive active material layer in contact with the underlying positive active material layer and away from the positive electrode current collector; and wherein the underlying positive active material layer comprises a first positive active material, a first polymer material and a first conductive material, and based on the total weight of the underlying layer positive active material layer, the first positive active material has a content of A % by weight, the first polymer material has a content of B % by weight, and the first conductive material has a content of C % by weight; wherein the first positive active material satisfies 10 wt %≤A %≤60 wt %, the first polymer material satisfies 35 wt %≤B %≤75 wt %, and the first conductive material satisfies 5 wt %≤C %≤25 wt %;

wherein the upper positive active material layer comprises a second positive active material, a second polymer material and a second conductive material, and based on the total weight of the upper positive active material layer, the second positive active material has a content of A'% by weight, the second polymer material has a content of B'% by weight, and the second conductive material has a content of C'% by weight;

wherein A %<A'%, B %>B'%, C %≥C'%;

wherein the first polymer material comprises fluorinated polyolefin and/or chlorinated polyolefin polymer material having a crosslinked structure; and wherein the first positive active material has a specific surface area (BET) of at most 500 m$^2$/g.

2. The battery according to claim 1, wherein the second positive active material satisfies 90 wt %≤A'%≤99 wt %, the second polymer material satisfies 0.5 wt %≤B'%≤5 wt %, and the second conductive material satisfies 0.5 wt %≤C'%≤5 wt %.

3. The battery according to claim 1, wherein the first polymer material is the fluorinated polyolefin and/or chlorinated polyolefin polymer material having a crosslinked structure.

4. The battery according to claim 1, wherein the first polymer material is a mixed material of fluorinated polyolefin and/or chlorinated polyolefin polymer material with a difficultly soluble polymer material, wherein the difficultly soluble polymer material has a solubility in an oil solvent, which is less than the solubility of the fluorinated polyolefin and/or chlorinated polyolefin polymer material in the oil solvent.

5. The battery according to claim 1, wherein based on the total weight of the underlying positive active material layer, the fluorinated polyolefin and/or chlorinated polyolefin polymer material has a content of B1% satisfying B1%≥17.5 wt %.

6. The battery according to claim 4, wherein the oil solvent is NMP.

7. The battery according to claim 4, wherein the difficultly soluble polymer material is an oil-dispersible polymer material or a water-dispersible polymer material; and wherein the oil-dispersible polymer material is selected from at least one of oil-dispersible polyacrylonitrile, oil-dispersible polyacrylic acid, oil-dispersible polyacrylate, oil-dispersible polyacrylic acid-acrylate, oil-dispersible polyacrylonitrile-acrylic acid, and oil-dispersible polyacrylonitrile-acrylate; and wherein the water-dispersible polymer material is selected from at least one of water-dispersible polyacrylic acid, water-dispersible polyurethane, water-dispersible polyvinyl alcohol, water-dispersible PVDF, water-dispersible polyacrylate, water-dispersible polytetrafluoroethylene, and water-dispersible polyacrylonitrile.

8. The battery according to claim 1, wherein the fluorinated polyolefin and/or chlorinated polyolefin polymer material is selected from at least one of polyvinylidene fluoride (PVDF), carboxylic acid modified PVDF, acrylic acid modified PVDF, polyvinylidene chloride (PVDC), carboxylic acid modified PVDC, acrylic acid modified PVDC, PVDF copolymer and PVDC copolymer.

9. The battery according to claim 1, wherein the first conductive material is selected from at least one of a conductive carbon-based material, a conductive metal material, and a conductive polymer material; and wherein the conductive carbon-based material is selected from at least one of conductive carbon black, acetylene black, graphite, graphene, carbon nanotubes, and carbon nanofibers; and wherein the conductive metal material is selected from at least one of Al powder, Ni powder, and gold powder; and wherein the conductive polymer material is selected from at least one of conductive polythiophene, conductive polypyrrole, and conductive polyaniline.

10. The battery according to claim 1, wherein the first positive active material is selected from at least one of lithium cobalt oxide, lithium nickel manganese cobalt oxide, lithium nickel manganese aluminate, lithium iron phosphate, lithium vanadium phosphate, lithium cobalt phosphate, lithium manganese phosphate, lithium iron manganese phosphate, lithium iron silicate, lithium vanadium silicate, lithium cobalt silicate, lithium manganese silicate, spinel lithium manganese oxide, spinel lithium nickel manganese oxide, lithium titanium oxide, or at least one of a conductive carbon coating modified above material, a conductive metal coating modified above material or a conductive polymer coating modified above material.

11. The battery according to claim 1, wherein the first positive active material is at least one of lithium iron phosphate, lithium vanadium phosphate, lithium cobalt phosphate, lithium manganese phosphate, lithium manganese iron phosphate or at least one of a conductive carbon coating modified above material, a conductive metal coating modified above material or a conductive polymer coating modified above material.

12. The battery according to claim 1, wherein the positive electrode current collector is a metal current collector, and wherein the metal current collector has a thickness of 4 μm to 16 μm; and wherein the metal current collector has an elongation at break δ satisfying 0.8%≤δ≤64%.

13. The battery according to claim 1, wherein the battery has a DC resistance growth rate of 100% or more at 130° C., or when the at least two layers of positive active material layers are collectively referred to as a positive electrode film layer, an adhesion force between the positive electrode film layer and the positive electrode current collector is at least 10 N/m.

* * * * *